US010783319B2

(12) United States Patent
Henderson et al.

(10) Patent No.: US 10,783,319 B2
(45) Date of Patent: Sep. 22, 2020

(54) METHODS AND SYSTEMS OF CREATION AND REVIEW OF MEDIA ANNOTATIONS (71) Applicants: Jason Henderson, Las Vegas, NV (US); Brandon Peterson, Las Vegas, NV (US); Jason McKinley, Las Vegas, NV (US)

(72) Inventors: Jason Henderson, Las Vegas, NV (US); Brandon Peterson, Las Vegas, NV (US); Jason McKinley, Las Vegas, NV (US)

(73) Assignee: COACHMYVIDEO.COM LLC, Las Vegas, NV (US)

(*) Notice: Subject to any disclaimer, the term of this patent is extended or adjusted under 35 U.S.C. 154(b) by 158 days.

(21) Appl. No.: 13/794,491

(22) Filed: Mar. 11, 2013

(65) Prior Publication Data
US 2014/0258831 A1 Sep. 11, 2014

(51) Int. Cl.
H04N 21/472 (2011.01)
H04N 21/858 (2011.01)
H04B 10/25 (2013.01)
H03K 5/22 (2006.01)
G06F 40/169 (2020.01)
G06F 16/74 (2019.01)
G06F 3/0488 (2013.01)

(52) U.S. Cl.
CPC ........ G06F 40/169 (2020.01); G06F 3/04883 (2013.01); G06F 16/74 (2019.01)

(58) Field of Classification Search
CPC . G06F 17/241; G06F 17/2247; G06F 3/04883

USPC .......................................................... 715/233
See application file for complete search history.

(56) References Cited

U.S. PATENT DOCUMENTS

| 6,310,839 | B1 | 10/2001 | Lee et al. |
| 6,539,163 | B1* | 3/2003 | Sheasby ............... G11B 27/034 348/278 |
| 6,549,922 | B1* | 4/2003 | Srivastava et al. |
| 6,687,877 | B1* | 2/2004 | Sastry .................... G06F 17/241 709/204 |
| 7,660,416 | B1* | 2/2010 | Kline ............................ 380/216 |
| 8,738,706 | B1* | 5/2014 | Grieve .................... G06F 17/24 709/205 |
| 2002/0007485 | A1 | 1/2002 | Rodriguez et al. |
| 2004/0042764 | A1 | 3/2004 | Takinami et al. |
| 2004/0267738 | A1 | 12/2004 | Shin |
| 2005/0188016 | A1* | 8/2005 | Vdaygiri et al. ............. 709/205 |
| 2005/0262081 | A1* | 11/2005 | Newman ........... G06F 17/30994 |
| 2005/0273700 | A1* | 12/2005 | Champion .......... G06F 3/04883 715/233 |
| 2007/0067707 | A1* | 3/2007 | Travis et al. .............. 715/500.1 |
| 2007/0116317 | A1 | 5/2007 | Ozawa |

(Continued)

Primary Examiner — Cesar B Paula
Assistant Examiner — Luu-Phuong T Nguyen
(74) Attorney, Agent, or Firm — Sheppard Mullin Richter & Hampton LLP (57) ABSTRACT A method for creation and review of media annotations allows creators to create different types of annotations to one or more media files of different types. Annotations are created in such a way that annotator's commands in making the annotations are also captured. Multiple creators may create annotations simultaneously and reviewers may review all the annotations in real time. Alternatively, multiple people may create annotations one by one and reviewers may review all the annotations created.

15 Claims, 6 Drawing Sheets (56) References Cited

U.S. PATENT DOCUMENTS

| | | | |
|---|---|---|---|
| 2007/0198744 A1* | 8/2007 | Wensley | H04L 12/1827 709/248 |
| 2008/0154908 A1* | 6/2008 | Datar | G11B 27/11 |
| 2009/0177301 A1 | 7/2009 | Hayes | |
| 2010/0002066 A1* | 1/2010 | Nelson | 348/14.1 |
| 2010/0058181 A1* | 3/2010 | Ganesan | G06Q 10/06 715/700 |
| 2010/0081116 A1* | 4/2010 | Barasch | A63B 24/0003 434/252 |
| 2010/0082681 A1 | 4/2010 | Adimatyam et al. | |
| 2010/0241691 A1* | 9/2010 | Savitzky | G06F 15/16 709/203 |
| 2011/0145692 A1* | 6/2011 | Noyes | G06Q 10/10 715/230 |
| 2011/0280549 A1* | 11/2011 | Walker | H04N 21/00 386/240 |
| 2012/0096358 A1* | 4/2012 | Barnes, Jr. | G06Q 10/1053 715/728 |
| 2012/0114307 A1* | 5/2012 | Yang | G06F 17/30256 386/278 |
| 2012/0297284 A1* | 11/2012 | Matthews et al. | 715/233 |
| 2012/0315014 A1 | 12/2012 | Shuster | |
| 2013/0047066 A1* | 2/2013 | Lee | G06Q 10/10 715/229 |
| 2014/0032482 A1* | 1/2014 | Dulaney | G06F 17/30056 707/607 |
| 2014/0082635 A1* | 3/2014 | Sitrick | G06F 17/211 719/318 |

* cited by examiner

METHODS AND SYSTEMS OF CREATION AND REVIEW OF MEDIA ANNOTATIONS

FIELD OF THE INVENTION

The present invention relates generally to multimedia, and more particularly, to a method and system to create and review annotations to a media file.

BACKGROUND OF THE INVENTION

People create annotations and comments to a media file for many purposes. For example, an instructor annotates on a student's performance video to improve that student's skills. A family member comments on a family photo, which will be shared with another family member. Usually, a person can only annotate on one media file at one time. When there are multiple files, the person has to make annotations or comments to each file one by one. Furthermore, the person's option of making annotations is limited, that is, the person can make only one type of annotation at a time. For example, after choosing to make audio comments, the person no longer makes other types of annotations, such as video annotations, text annotations, or drawing annotations. Moreover, the creator may take some actions or make commands to control or manipulate the media file while making annotations such as pause a video to make elaborate annotations to a scene, fast forward to skip irrelevant materials, or zoom in a picture for a closer display. It is rather difficult for the viewer to comprehend the commentator's annotations when the creator's commands are not captured or synchronized to the original media file. In addition, as media files are large in size, it generally requires significant processing time and memory resources to create annotations to a media file. There is also a risk that the annotation created by one device cannot be reviewed due to device or operating system incompatibility.

BRIEF SUMMARY OF EMBODIMENTS OF THE INVENTION

Various embodiments of the present invention provide a system and a method that facilitate creation and review of annotations to a media file. Various embodiments of the present invention allow users to create various types of annotations to various types of media files. Users of various embodiments of the present invention may create audio, video, drawing, text or other types of annotations to one or more media files. By way of example, the media file or combinations thereof may be a photo, a movie, or an audio recording. Additionally, according to various embodiments, annotations to media files are created in such a way that the creator's commands or actions to the media files accompanying annotating are also captured, which facilitates later review of the annotations. The reviewer reviews annotations just in the way that the annotations are created by the creator.

Additionally, various embodiments allow creators to select how the annotations as well as the command are stored, and allow reviewers to select how the annotations should be presented. Creators may choose to store annotations and commands separately. In one embodiment, annotations are stored as annotation media files and commands are stored as command files. Alternatively, creators may choose to store the original media files, the annotations, and the commands in one place. In one embodiment, a media file is created that composites the original media files, the annotations, and the commands. Reviewers may review the annotations by playing the created files to review to annotations using systems and methods provided in various embodiments.

Furthermore, various embodiments allow multiple people to create annotations simultaneously or one-by-one at different times. Reviewers will be able to review all the annotations from all the creators.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

These figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward systems and methods for creation and review of media annotations. Through various embodiments of the present invention, creators can create different types of annotations to one or more media files of different types. Creators have different options for storing the annotations. Annotations are created in such a way that annotator's commands in making the annotations are also captured. Multiple people may create annotations simultaneously and reviewers may review the annotations live. Alternatively, multiple people may create annotations sequentially and reviewers may review all the annotations created.

Before describing the invention in further detail, it may be useful to describe a few example environments in which various embodiments of the present invention can be implemented. One such example is that of illustrated in FIG. 1.

Figure 1:
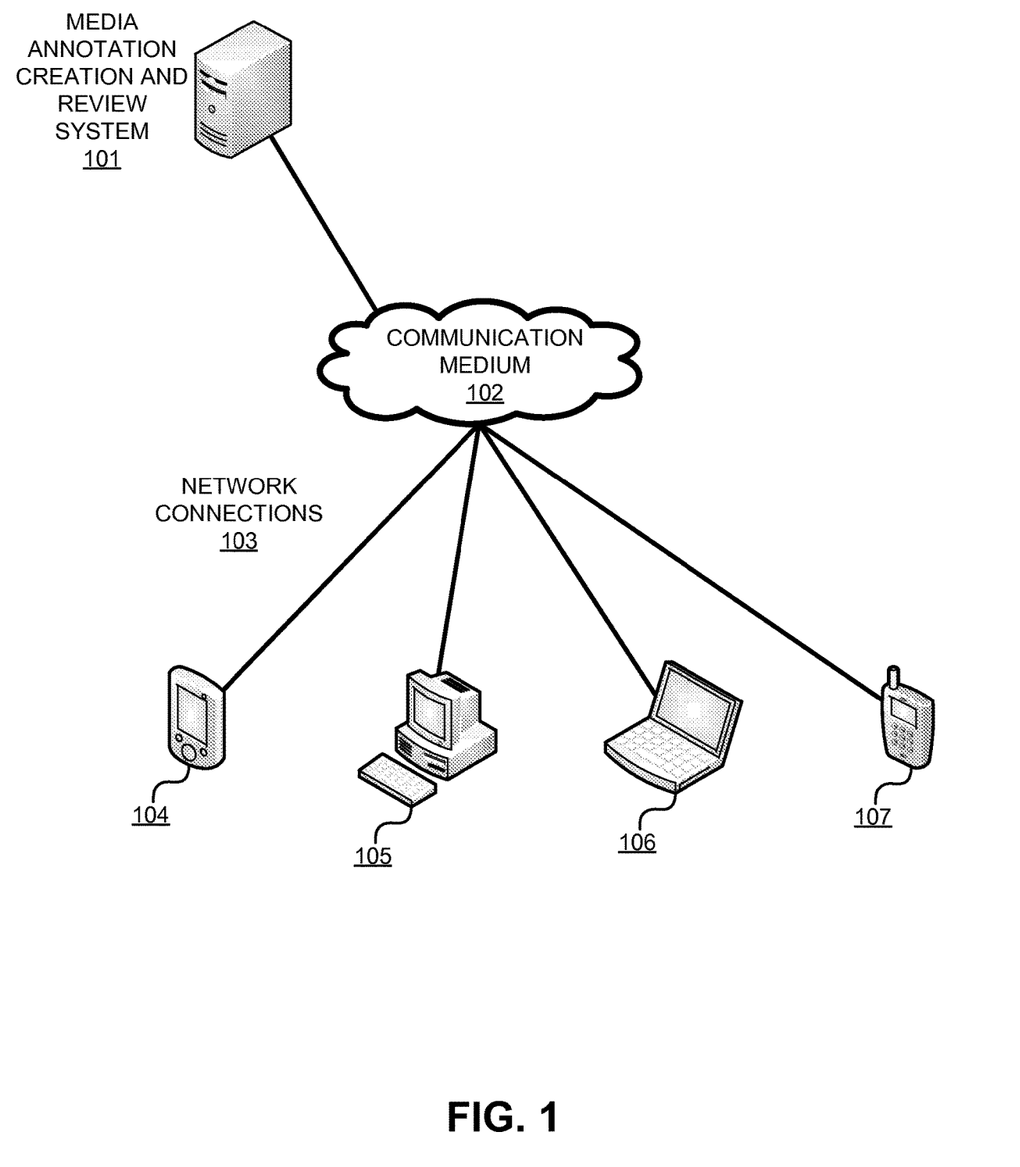
FIG. 1 is a diagram illustrating an exemplary media annotation creation and review system according to one embodiment of the present invention implemented in an example environment.

FIG. 1 illustrates an example media annotation creation and review system 101 in accordance with one embodiment of the invention, and implemented in an environment comprising various computing devices connected to it via a communication medium 102. In various embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium. As shown, computing devices such as a PDA 104 (e.g., Windows Mobile® device), a desktop computer 105, a laptop computer 106, and a smartphone 107 (e.g., iPhone®), through their respective network connections 103, can either interact directly or indirectly with media annotation creation and review system 101 to create and review media annotations. The various computing devices (104, 105, 106, and 107) and the media annotation creation and review system 101 described herein may be implemented using the example computer system illustrated in FIG. 6.

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

Figure 2:
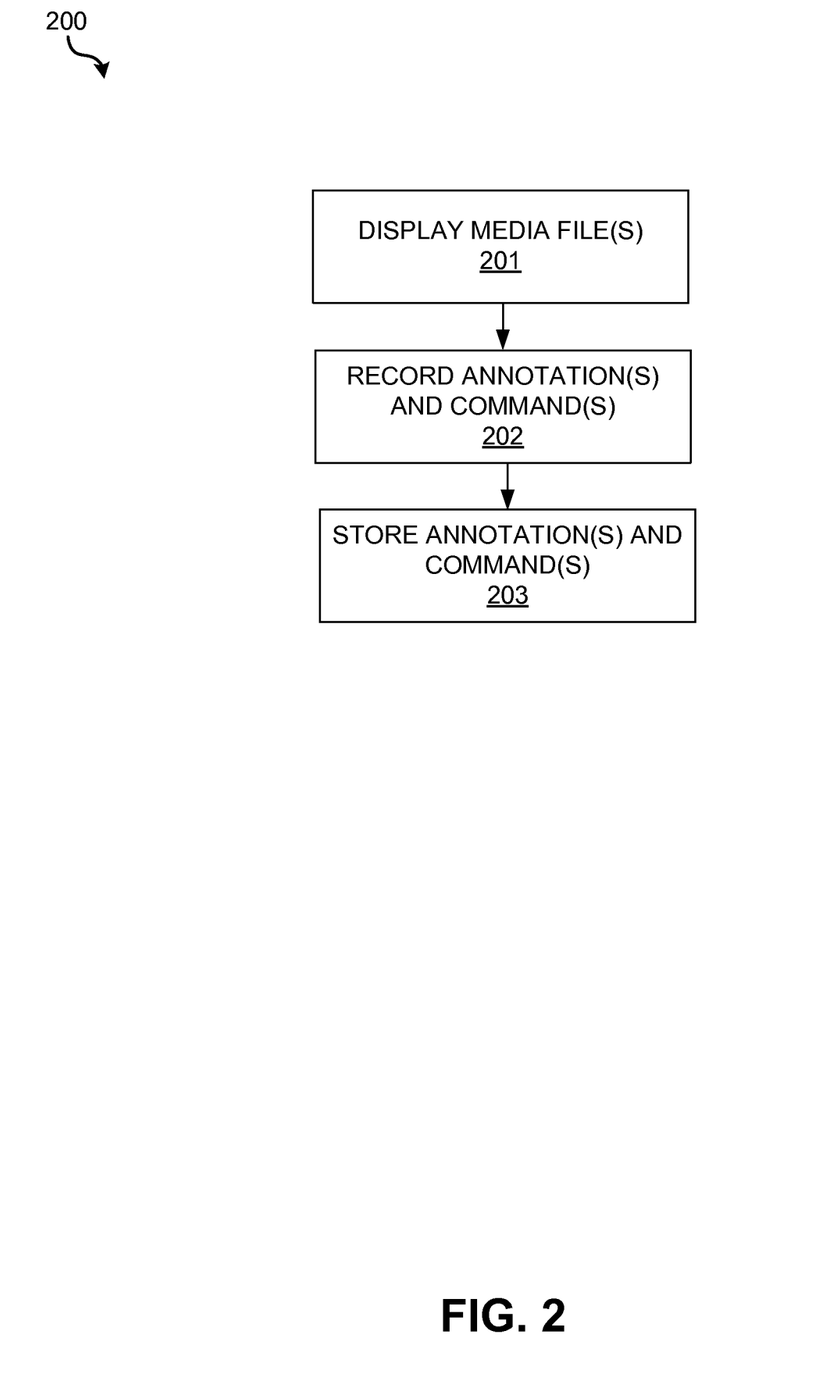
FIG. 2 is a flow chart illustrating an exemplary method of creating annotations to media files in accordance with an embodiment of the methods and systems described herein.

FIG. 2 is a flow chart illustrating an exemplary method of creating annotations to media files in accordance with an embodiment of the methods and systems described herein. The method allows a user to create annotations to one or more media files at the same time. The annotations include many types of comments or illustrations, such as video comments, audio comments, drawings, texts, etc. At operation 201, the method displays the media files that a user will annotate. At operation 202, the method records the user's annotations as well as the accompanying commands, if any. The commands include (i) actions that the user takes in making annotations, such as play, pause, skip, step, change media files, or other controls; (ii) actions related to drawing on the media file using tools such as freehand lines, straight lines, multiple lines with angles calculated, circles, rectangles, text boxes, or other drawing tools; or (iii) actions related to transforming the media files such as zooming, panning, rotating, filtering, or other transformations. At operation 203, the method stores the recorded annotations together with commands. In one embodiment, the method stores the recorded annotations as an annotation media file. In various embodiments, the method stores the recorded commands as another file. In one embodiment, the method processes the recorded commands into a plurality of macro steps and stores the recorded commands as a macro.

Still referring to FIG. 2, in various embodiments, the method may resize the media files. In some embodiments, the method provides clipping tools. A user may select a portion of the media files (e.g., a frame, a certain time period) to make annotations. In one embodiment, the method provides down-convert tools: a user may also lower the media file quality at operation 201 to account for network/hardware limitations, and later composite the commands using the original, higher-quality media file.

Figure 3:
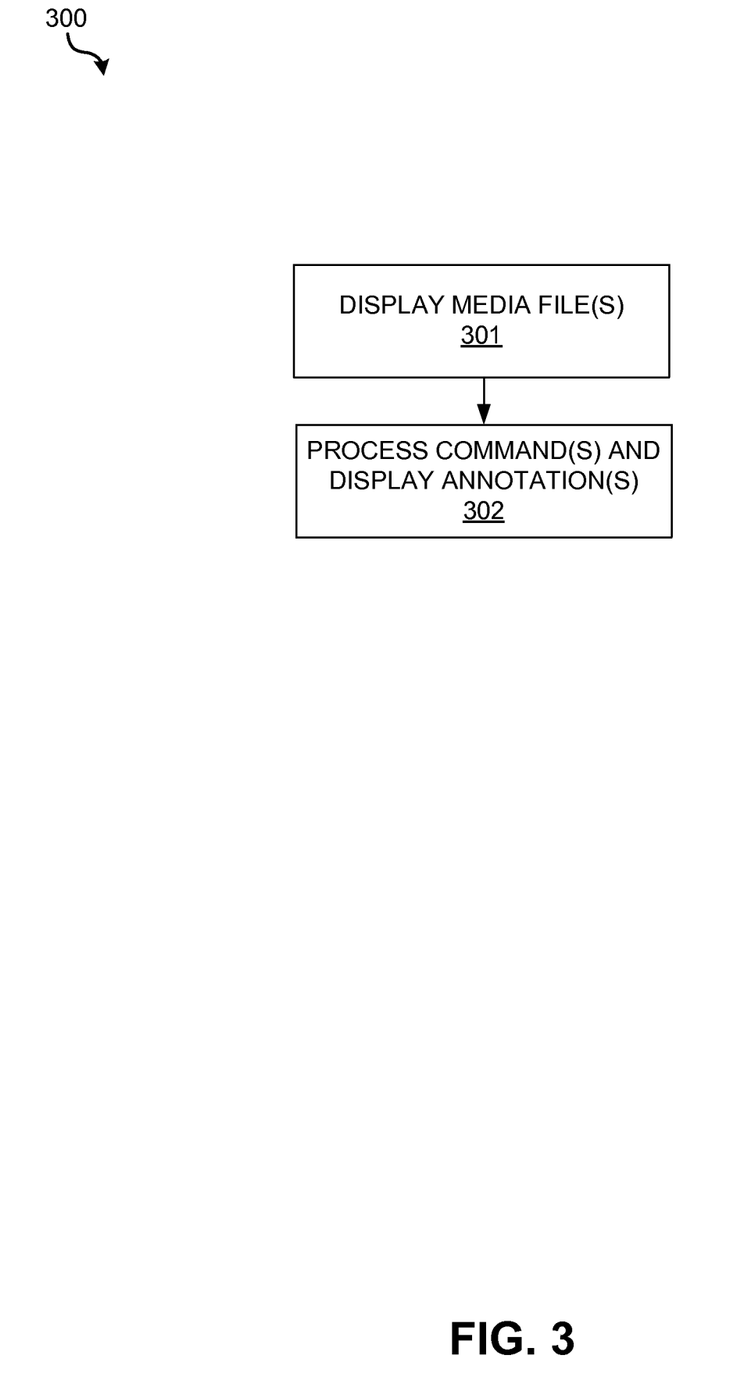
FIG. 3 is a flow chart illustrating an exemplary method of reviewing annotations in accordance with an embodiment of the methods and systems described herein.

FIG. 3 is a flow chart illustrating an exemplary method of reviewing annotations in accordance with an embodiment of the methods and systems described herein. The method displays the original media files, and the annotations as well as executes the commands accompanying the annotations. Various embodiments replicate how the annotations are created. Annotations are presented to the reviewers as if the creator annotates the media files in front of the reviewers. At operation 301, the method displays the original media files. At operation 302, the method processes the recorded commands and displays the recorded annotations. In one embodiment, the method displays the recorded annotations and the original media files according to a reference time. In various embodiments, the method processes the command file comprising a set of steps associated with the commands accompanying making the annotations. The method processes each step sequentially. In processing each step, the method determines a corresponding command and the time point at which the creator makes the command to the original media files. When there are multiple original media files, the method determines which file or which files out of the original files that the command corresponds to and executes the command accordingly.

Still referring to FIG. 3, in further embodiments, when processing the steps of a command file, the method determines the annotation corresponding to the time point and displays the original media files along with the annotations at each time point. In one embodiment, the command file is a macro, and the method processes each macro step sequentially to present the original media files together with the annotations.

Figure 4:
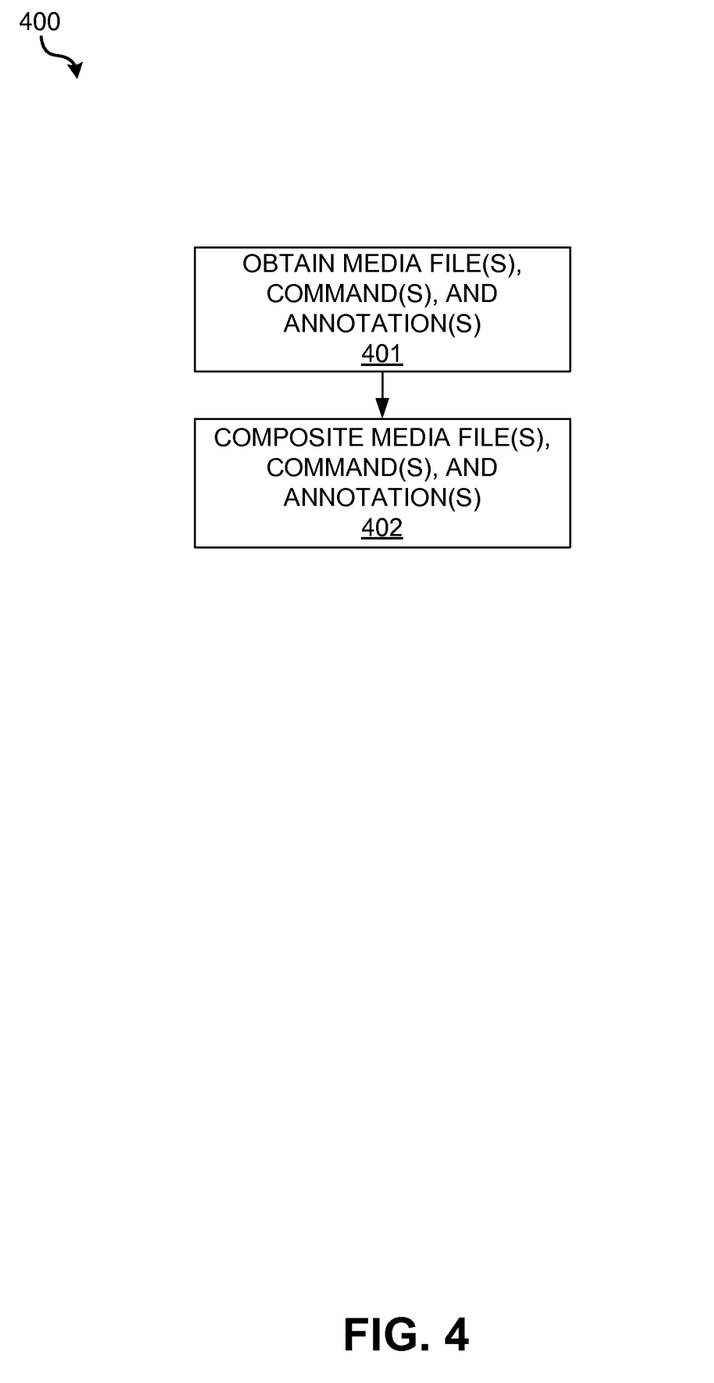
FIG. 4 is a flow chart illustrating an exemplary method of creating storing annotations in accordance with an embodiment of the methods and systems described herein.

FIG. 4 is a flow chart illustrating an exemplary method of creating and storing annotations in accordance with an embodiment of the methods and systems described herein. The method creates a media file that composites the original media files, the annotations, and the commands, if any. A reviewer can simply review the annotations as well as the original media files by playing the composite media file. At operation 401, the method obtains the original media files, the annotations, and the commands. In one embodiment, the method obtains a command file to obtain the commands. In various embodiments, the method obtains an annotation media file to obtain the annotations. In various embodiments, the method obtains the original media files by locating the media files and retrieving it accordingly. The original media files can be either stored locally, uploaded from elsewhere, or downloaded from a remote site or URL. In further embodiments, the method collects the metadata of all the media files obtained including the original media files and the annotation media files.

With further reference to FIG. 4, at operation 402, the method composites the original media files, the annotations, and the commands into one media file. In various embodiments, this compositing can occur on any of the creator or reviewer devices or on a central server. In various embodiments, the method processes the commands by executing the steps in the command file sequentially. The method determines a time unit for processing each step, creates a fraction of the composite media file for that time unit, and updates the output media file with the created fraction. In processing each step, the method determines the command and the corresponding original media files that the command is made to by the annotation creator. The method applies the command to the corresponding original media files. The method creates a fraction of the composite media file for that time unit by updating the states of the original media files. In one embodiment, the time unit is the frame rate of the composite media file. In another embodiment, the time unit is variable to account for hardware limitations at the time of recording of the commands.

In various embodiments, the method determines which players should be used to play or display the original media files, how the original media files should be displayed (e.g., the relevant location, the color scheme), what fraction of the original media files should be displayed for that time unit, whether appropriate resizing and transformations are needed, and other similar information used for play and display. When the annotations include text, pictures, drawings, or other illustrative types of comments, the method makes corresponding illustrative comments on the fraction of the original media file or media files. For example, the method draws lines, freehand, circles, rectangles, angles, and writes texts, etc. After processing the command for that time unit, the method appends the fraction of the composite media file to those fractions that have already been created. In one embodiment, the method uses an encoder and a decoder to create the composite media file.

Figure 5:
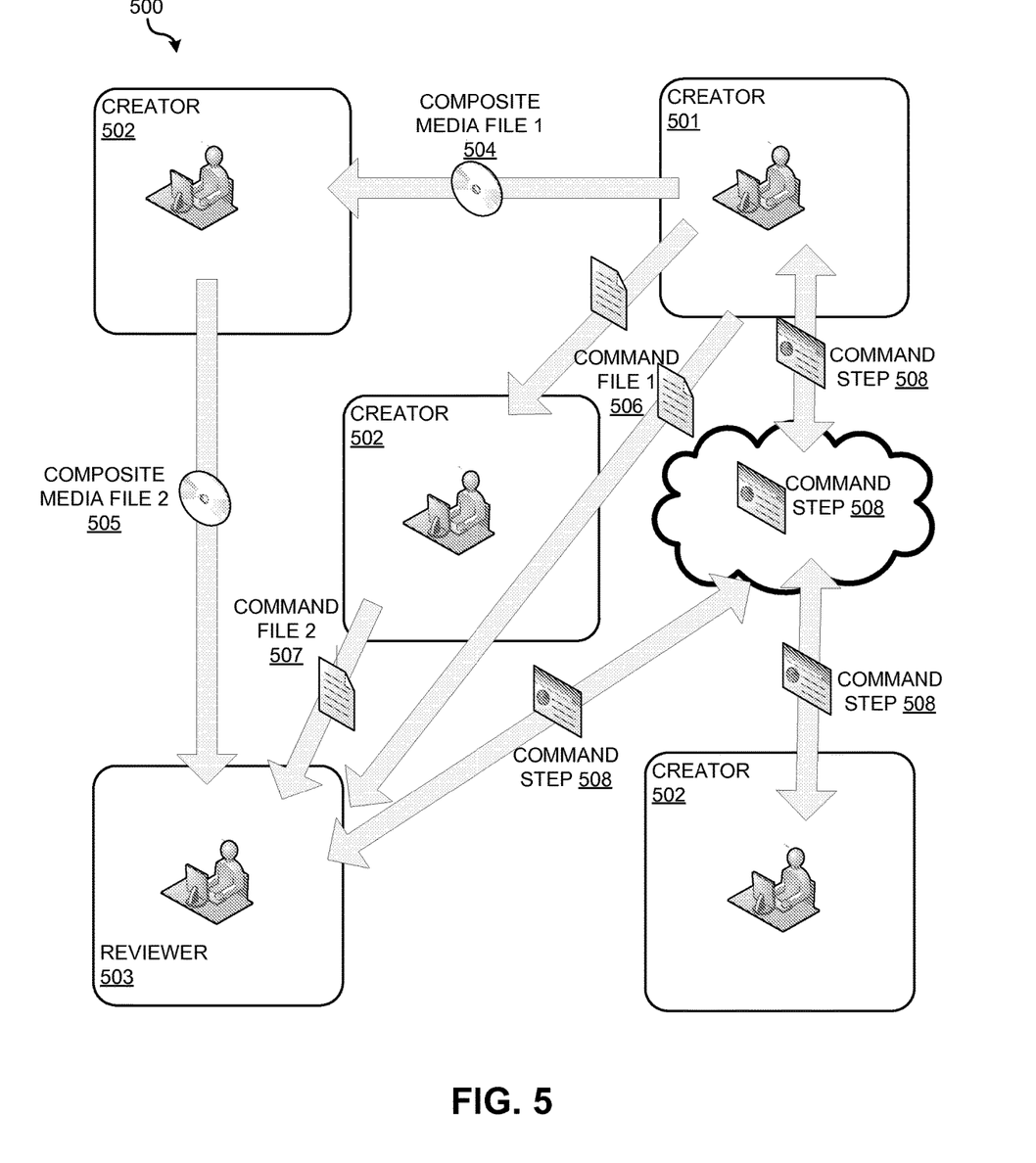
FIG. 5 is a diagram illustrating an exemplary media annotation creation and review system in accordance with an embodiment of the methods and systems described herein.

FIG. 5 is a diagram illustrating an exemplary media annotation creation and review system in accordance with an embodiment of the methods and systems described herein. More particularly, FIG. 5 depicts the interactions between an annotation creator 501, an annotation creator 502, and a reviewer 503 when making annotations collectively in accordance with one embodiment of the invention. In one embodiment, the annotation creator 501 annotates the original media files, and the annotation creator 502 annotates on top of the annotations created by the annotation creator 501. The reviewer 503 reviews the annotations created by both the annotation creator 501 and the annotation creator 502.

Upon creating a set of annotations to the original media files, the annotation creator 501 may choose to create a composite media file 504, in which the original media files, the annotations created by the annotation creator 501 as well as the commands during the process of creation are combined. The composite media file 504 may be sent to the annotation creator 502 for making additional annotations. In various embodiments, the composite media file 504 is shared between the creator 501 and the creator 502 via emails, text messages, SMS/MMS texts, chats, streaming, peer-to-peer, or other communication means. In various embodiments, the creator 501 uploads the composite media file to a server, creates a link to the uploaded composite media file 504, and shares the link with the creator 502 via emails, text messages, SMSs, chats, or other communication means. The annotation creator 502 creates additional annotations to the composite media file 504 and create a composite media file 505, in which the composite file 504, the annotations created by the annotation creator 502 as well as the commands of the creator 502 are combined. The composite media file 505 may be shared between the annotation creator 502 and the reviewer 503 by various communication means. The reviewer 503, when reviewing the composite media file 505, is presented with the annotations from both creator 501 and creator 502.

Still referring to FIG. 5, upon creating a set of annotations to the original media files, the annotation creator 501 may choose to share the recorded annotations and commands with the annotation creator 502. In various embodiments, the annotation creator 501 may create a first command file 506, which records the commands; and an annotation media file, which records the annotations. The annotation creator 501 shares the first command file 506 via various communication means described above. In various embodiments, the annotation creator 501 may also share the annotation media file together with the first command file 506. The annotation creator 502 then makes annotations to the original media files in addition to the annotations created by the annotation creator 501 by executing first the command file 506 and the annotation media file shared by the annotation creator 501.

In various embodiments, the annotation creator 502 may record the commands as a second command file 507 and creates another annotation media file to record the annotations. The reviewer 503 reviews the annotations from both the annotation creator 501 and creator 502 by playing the original media files, the first command file 506 and the second command file 507, as well as the annotation media files created respectively by the annotation creator 501 and the creator 502. In various embodiments, the annotation creator 502 may record the commands by updating the first command file 506, in which case, the command file 507 comprises the commands from both the annotation creator 501 and the annotation creator 502. The annotation creator 502 may update the annotation media file created by the annotation creator 501 or create a separate annotation media file. The reviewer 503 reviews the annotations from both the annotation creator 501 and creator 502 by playing the original media files, the second command file 507, as well as the annotation media files.

With further reference to FIG. 5, various embodiments support making collective annotations simultaneously among multiple creators. The annotation creator 501 may choose to host a live session of making annotations, and the annotation creator 502 and the reviewer may participate in the live session. All the annotations are broadcast to all the participants live. When the annotation creator 501 makes annotations, any accompanying command is recorded and processed into a set of command steps 508, which are broadcast to all the participants of the live session. The participants, such as the annotation creator 502, can also make annotations when the creator 501 is making annotations. The reviewer 503, as a participant, may review the annotations live by processing the set of command steps 508. In various embodiments, the annotation media file created by the creator 501 when making annotations is also shared with all the participants during the live session.

The terms "a set of" and "the set of" may be used herein to describe the quantity of various objects is one or more.

Figure 6:
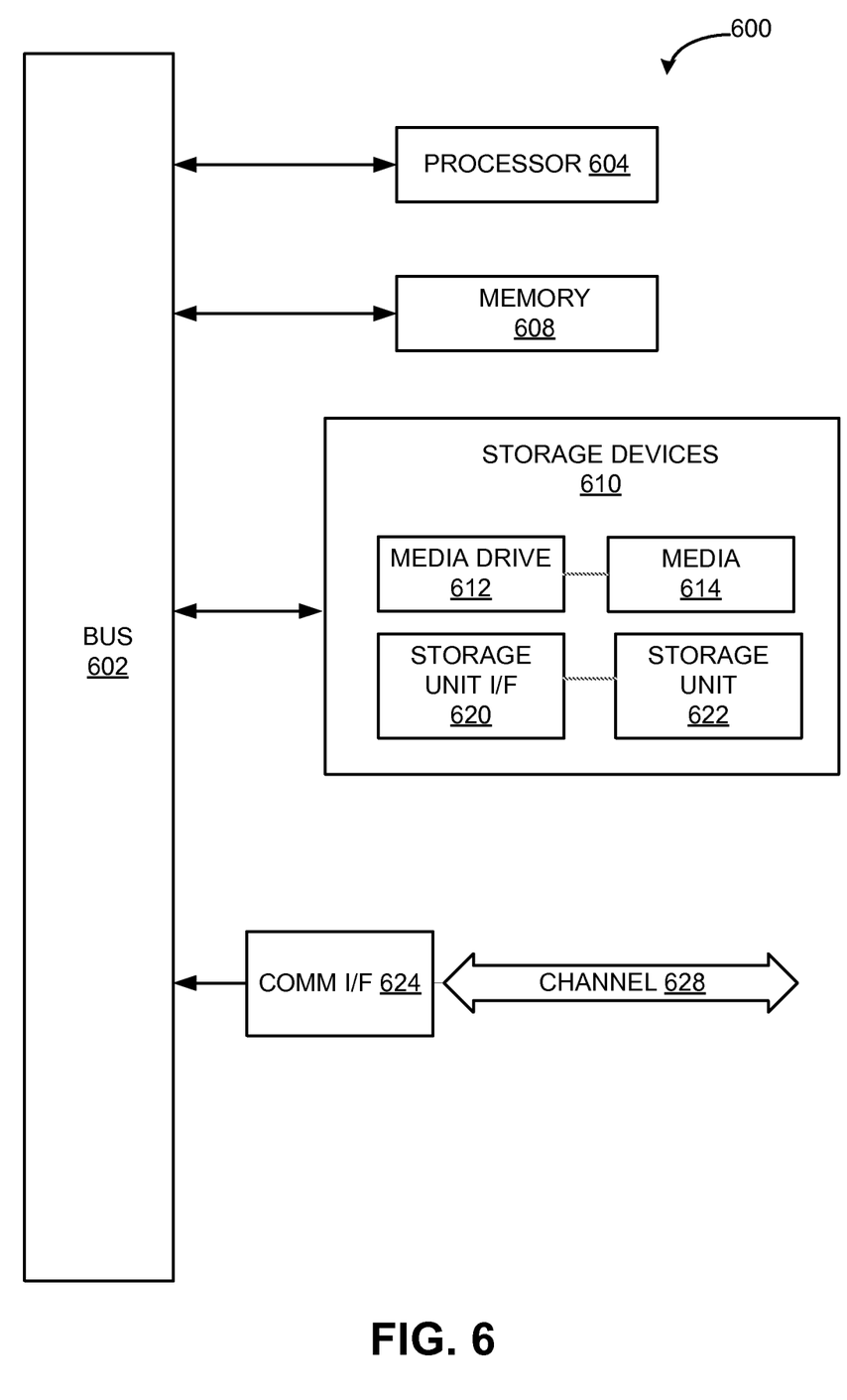
FIG. 6 is a diagram illustrating a computing system that can be used in conjunction with some embodiments of the invention.

As used herein, the term "system" might describe a given unit of functionality that can be performed in accordance with one or more embodiments of the present invention. As used herein, a system might be implemented utilizing any form of hardware, software, or a combination thereof. For example, one or more processors, controllers, ASICs, PLAs, PALs, CPLDs, FPGAs, logical components, software routines or other mechanisms might be implemented to make up a system. In implementation, the various systems described herein might be implemented as discrete systems or the functions and features described can be shared in part or in total among one or more systems. In other words, as would be apparent to one of ordinary skill in the art after reading this description, the various features and functionality described herein may be implemented in any given application and can be implemented in one or more separate or shared systems in various combinations and permutations. Even though various features or elements of functionality may be individually described or claimed as separate systems, one of ordinary skill in the art will understand that these features and functionality can be shared among one or more common software and hardware elements, and such description shall not require or imply that separate hardware or software components are used to implement such features or functionality.

Where components or systems of the invention are implemented in whole or in part using software, in one embodiment, these software elements can be implemented to operate with a computing or processing system capable of carrying out the functionality described with respect thereto. One such example-computing system is shown in FIG. 6. Various embodiments are described in terms of this example-computing system 600. After reading this description, it will become apparent to a person skilled in the relevant art how to implement the invention using other computing systems or architectures.

Referring now to FIG. 6, computing system 600 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control systems, or other processing devices, such as a processor 604. Processor 604 might be implemented using a general-purpose or special-purpose processing engine such as, for example, a microprocessor, controller, or other control logic. In the example illustrated in FIG. 6, processor 604 is connected to a bus 603, although any communication medium can be used to facilitate interaction with other components of computing system 600 or to communicate externally.

Computing system 600 might also include one or more memory systems, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 603 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory system) and memory slot, a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and signals on channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent system names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "system" does not imply that the components or functionality described or claimed as part of the system are all configured in a common package. Indeed, any or all of the various components of a system, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
   displaying a set of media files;
   recording a first set of steps reflecting a first set of commands over the set of media files by a first user;
   recording a first set of annotations over the set of media files by the first user, such that individual annotations within the first set of annotations recorded by the first user are each associated with the first set of steps reflecting the first set of commands corresponding to each annotation recorded over the set of media files by the first user;
   simultaneously recording a second set of steps reflecting a second set of commands over the set of media files by a second user and a second set of annotations over the set of media files by the second user, such that individual annotations within the second set of annotations recorded by the second user are each associated with the second set of steps reflecting the set of commands corresponding to each annotation recorded over the second set of media files by the second user;
   storing the first set of steps recorded by the first user and the second set of steps simultaneously recorded by the second user as a first and second command file, respectively, and the first set of annotations recorded by the first user and the second set of annotations simultaneously recorded by the second user as first and second annotation media file, respectively; and
   creating and storing an annotated media file by compositing the first and second set of annotations stored in the first and second media annotation file, respectively, over the set of media files based on the sequence of commands of the first and second command file, respectively;
   wherein individual annotations within the first and second set of annotations of the first and second annotation media file are presented in the annotated file based on a sequence of individual commands of the first and second set of commands, corresponding to each annotation, respectively, with respect to a reference time within the set of media files; and
   wherein an individual annotation of the first set of annotations recorded by the first user are presented before an individual annotation of the second set of annotations recorded by the second user upon determining that the chronological sequence of an individual command corresponding to the individual annotation of the first user has the same time reference within the set of media files as an individual command corresponding to the individual annotation of the second user; and
   wherein the individual annotations recorded by the first and second user comprise at least one of text, pictures, drawings, and other illustrative types of comments.

2. The computer-implemented method of claim 1, further comprising determining a time unit, the time unit being a frame rate of the annotated media file.

3. The computer-implemented method of claim 1, wherein the step of processing the set of steps comprises:
   determining a command corresponding to a step of the first and second set of steps;
   determining a time point corresponding to the command;
   determining at least one media file of the first set of media files corresponding to the command; and
   performing the command to the annotated media file at the time point.

4. The computer-implemented method of claim 1, wherein the set of first and second steps further reflects a set of commands associated with the first and second set of annotations over the set of media files.

5. The computer-implemented method of claim 1, wherein the set of annotations comprises a video annotation, or an audio annotation.

6. The computer-implemented method of claim 1, wherein the set of commands comprises a media control action, a drawing action, or a media transform action.

7. The computer-implemented method of claim 1, further comprising down-converting the set of media files or clipping the set of media files.

8. A system comprising:
a processor and a computer executable program code embodied on a non-transitory computer readable medium configured to cause the processor to:
display a set of media files;
record a first set of steps reflecting a first set of commands over the set of media files by a first user;
record a first set of annotations over the set of media files by the first user, such that individual annotations within the first set of annotations recorded by the first user are each associated with the first set of steps reflecting the first set of commands corresponding to each annotation recorded over the set of media files by the first user;
simultaneously record a second set of steps reflecting a second set of commands over the set of media files by a second user and a second set of annotations over the set of media files by the second user, such that individual annotations within the second set of annotations recorded by the second user are each associated with the second set of steps reflecting the set of commands corresponding to each annotation recorded over the second set of media files by the second user;
store the first set of steps recorded by the first user and the second set of steps simultaneously recorded by the second user as a first and second command file, respectively, and the first set of annotations recorded by the first user and the second set of annotations simultaneously recorded by the second user as first and second annotation media file, respectively; and
create and store an annotated media file by compositing the first and second set of annotations stored in the first and second media annotation file, respectively, over the set of media files based on the sequence of commands of the first and second command file, respectively;
wherein individual annotations within the first and second set of annotations of the first and second annotation media file are presented in the annotated file based on a sequence of individual commands of the first and second set of commands, corresponding to each annotation, respectively, with respect to a reference time within the set of media files; and
wherein an individual annotation of the first set of annotations recorded by the first user are presented before an individual annotation of the second set of annotations recorded by the second user upon determining that the chronological sequence of an individual command corresponding to the individual annotation of the first user has the same time reference within the set of media files as an individual command corresponding to the individual annotation of the second user; and
wherein the individual annotations recorded by the first and second user comprise at least one of text, pictures, drawings, and other illustrative types of comments.

9. The system of claim 8, wherein the computer executable code is further configured to cause the processor to determine a time unit, the time unit being a frame rate of the annotated media file.

10. The system of claim 8, wherein the computer executable code is further configured to cause the processor to:
determine a command corresponding to a step of the first and second set of steps;
determine a time point corresponding to the command;
determine at least one media file of the first set of media files corresponding to the command; and
perform the command to the annotated media file at the time point.

11. The system of claim 8, wherein the first and second set of steps further reflects a set of commands associated with the first and second set of annotations over the set of media files.

12. The system of claim 8, wherein the first and second set of annotations comprises a video annotation, or an audio annotation.

13. The system of claim 8, wherein the set of commands comprises a media control action, a drawing action, or a media transform action.

14. The system of claim 8, wherein the computer executable code is further configured to cause the processor to:
down-convert the set of media files or clip the set of media files.

15. The system of claim 8, wherein the computer executable code is further configured to cause the processor to transmit the first and second command files and the first and second annotation media files.

* * * * *